United States Patent
Osman et al.

(10) Patent No.: US 9,211,948 B2
(45) Date of Patent: Dec. 15, 2015

(54) BETWEEN-WHEEL BOGIE MOUNTED TAXI SYSTEM

(71) Applicant: HONEYWELL INTERNATIONAL, INC., Morristown, NJ (US)

(72) Inventors: Med Osman, Gilbert, AZ (US); Louie Timothy Gaines, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 183 days.

(21) Appl. No.: 13/849,529

(22) Filed: Mar. 24, 2013

(65) Prior Publication Data
US 2014/0284421 A1 Sep. 25, 2014

(51) Int. Cl.
*B64C 25/40* (2006.01)

(52) U.S. Cl.
CPC ............. *B64C 25/405* (2013.01); *Y02T 50/823* (2013.01)

(58) Field of Classification Search
CPC ............................. B64C 25/405; B64C 25/36
See application file for complete search history.

(56) References Cited

U.S. PATENT DOCUMENTS

| | | | | |
|---|---|---|---|---|
| 1,812,143 A * | 6/1931 | Dugan | ............................. | 244/50 |
| 2,320,547 A * | 6/1943 | Tiger | ......................... | 244/103 S |
| 2,454,947 A * | 11/1948 | Schroeder | .................. | 244/103 S |
| 3,279,722 A | 10/1966 | Glover, Jr. et al. | | |
| 3,428,274 A * | 2/1969 | Ellis et al. | ................. | 244/103 R |
| 3,764,094 A * | 10/1973 | Cross | ................................. | 244/50 |
| 3,850,389 A * | 11/1974 | Dixon | ........................ | 244/103 S |
| 7,445,178 B2 | 11/2008 | McCoskey et al. | | |
| 8,474,748 B2 * | 7/2013 | Cros et al. | ........................ | 244/50 |
| 8,517,303 B2 * | 8/2013 | Dilmaghani | .......... | B64C 25/405 244/100 R |
| 2011/0233328 A1 * | 9/2011 | Alleau et al. | ............... | 244/102 R |
| 2012/0153075 A1 * | 6/2012 | Wilson et al. | .................... | 244/50 |

FOREIGN PATENT DOCUMENTS

| | | |
|---|---|---|
| DE | 102008011791 | 9/2009 |
| GB | 2330561 | 4/1999 |

OTHER PUBLICATIONS

DE 102008011791 english_machine_translation.*

* cited by examiner

*Primary Examiner* — Tien Dinh
*Assistant Examiner* — Alexander V Giczy
(74) *Attorney, Agent, or Firm* — Shimokaji IP

(57) ABSTRACT

A motor-driven landing gear apparatus for taxiing an aircraft includes a motor attached to a bogie. A wheel-driving device is attached to an axle of the landing gear apparatus. A telescoping shaft provides a torque-transmitting interconnection between the motor and the wheel-driving device during taxiing of the aircraft. The telescoping shaft includes an internally-splined shaft rotatably supported within a housing attached to the bogie.

13 Claims, 4 Drawing Sheets

BETWEEN-WHEEL BOGIE MOUNTED TAXI SYSTEM

BACKGROUND OF THE INVENTION

The present invention generally relates to aircraft landing gear and more particularly to landing gear with motor driven propulsion systems.

A typical aircraft may taxi on to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Wheel-driving taxi systems have been proposed to provide higher efficiency. A wheel-driving taxi system may be implemented by using electrical, hydraulic or pneumatic motors to provide the motive force for aircraft taxiing. While this general concept holds promise for improved efficiency, there are practical application problems that need to be addressed in any successful taxi system design. For example, it is desirable that a taxi system not diminish brake capacity and structural strength of wheels of an aircraft. Also, the taxi system should not impact normal take-off and landing procedures or aircraft performance. Additionally, the taxi system should not add excessive weight to an aircraft.

As can be seen, there is a need for a wheel-driving taxi system which may not adversely affect the aircraft braking system. Additionally there is a need for such a taxi system which does not interfere with safe aircraft operation during normal take-off and landing cycles. Also, the taxi system should be suitable for retrofitting into existing aircraft.

SUMMARY OF THE INVENTION

In one aspect of the present invention, a motor-driven landing gear apparatus for an aircraft may comprise one or more motors attached to a bogie, at least one wheel-driving device attached to an axle of the landing gear and at one least telescoping shaft interconnecting the at least one motor and the at least one wheel-driving device.

In another aspect of the present invention, a drive train for a motor driven aircraft landing gear may comprise a gear attached to a wheel of the landing gear and being coaxial with the wheel, a pinion engaged with the gear and a telescoping shaft interconnecting the pinion with a drive motor attached to a bogie of the landing gear.

In still another aspect of the invention, a method for taxiing an aircraft may comprise supplying power to at least one motor mounted on a bogie of a landing gear of the aircraft and transmitting rotational force from the at least one motor to at least one wheel of the landing gear through a telescoping shaft.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide wheel driving taxi systems positioned between wheels of an aircraft landing gear.

Figure 1:
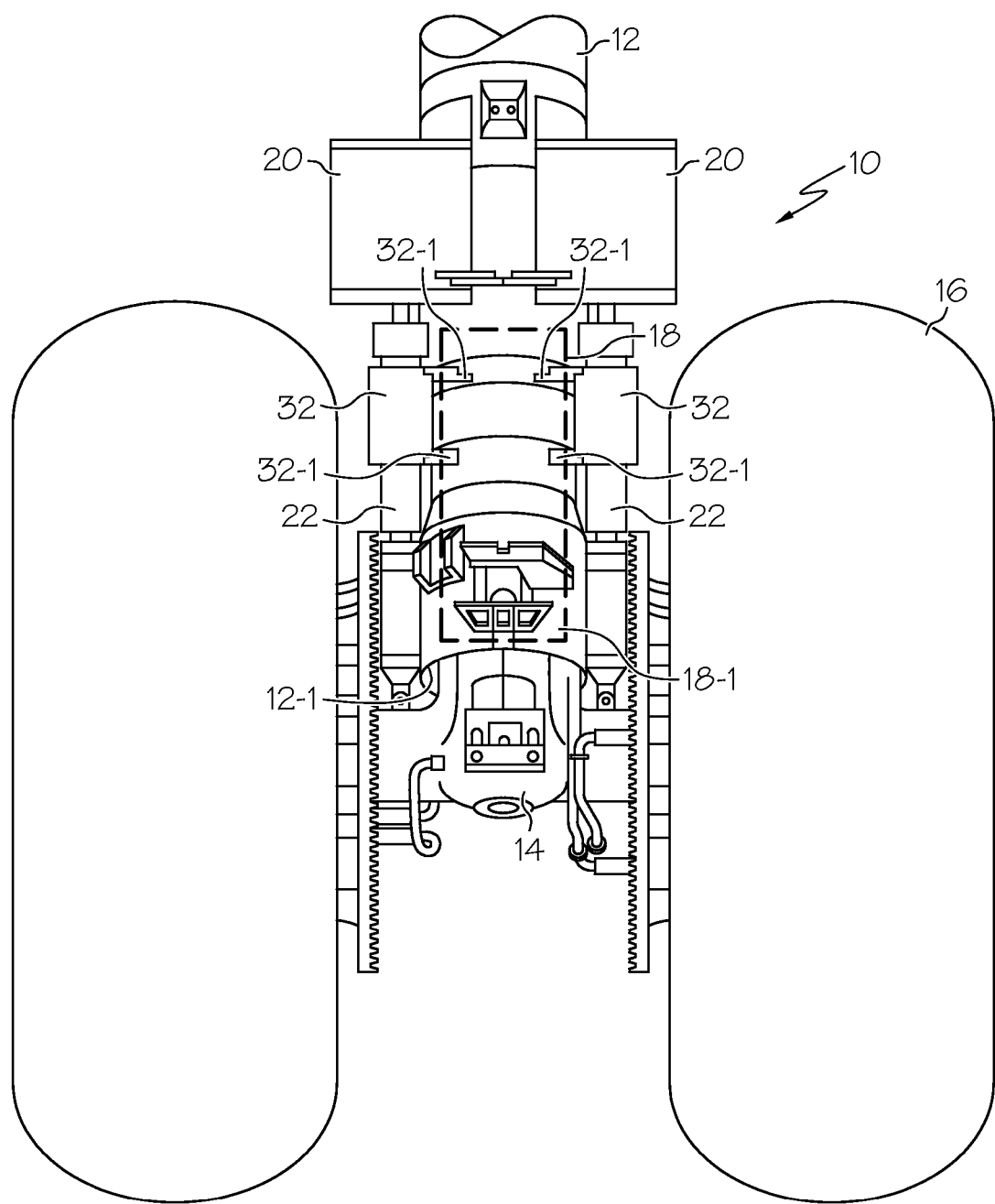
FIG. 1 is a perspective view of an aircraft landing gear in accordance with an embodiment of the invention.

Referring now to FIG. 1, it may be seen that an exemplary motor-driven landing gear assembly 10 may include a strut or bogie 12, an axle 14 that supports wheels 16 and one or more motors 20 attached to the bogie 12. The bogie 12 may include an internal shock absorber 18. The axle 14 may be connected to a lower end 18-1 of the shock absorber 18 so that, upon landing, the axle 14 and wheels 16 may move upwardly toward a lower end 12-1 of the bogie 12 as the shock absorber absorbs landing impact loads.

The motors 20 may be driven with electric, hydraulic or pneumatic power that may be supplied from a conventional auxiliary power unit (APU) of the aircraft (not shown). One or more drive-train assemblies 22 may interconnect the motors 20 with the wheels 16 so that the motors 20 may drive the wheels 16.

Figure 2:
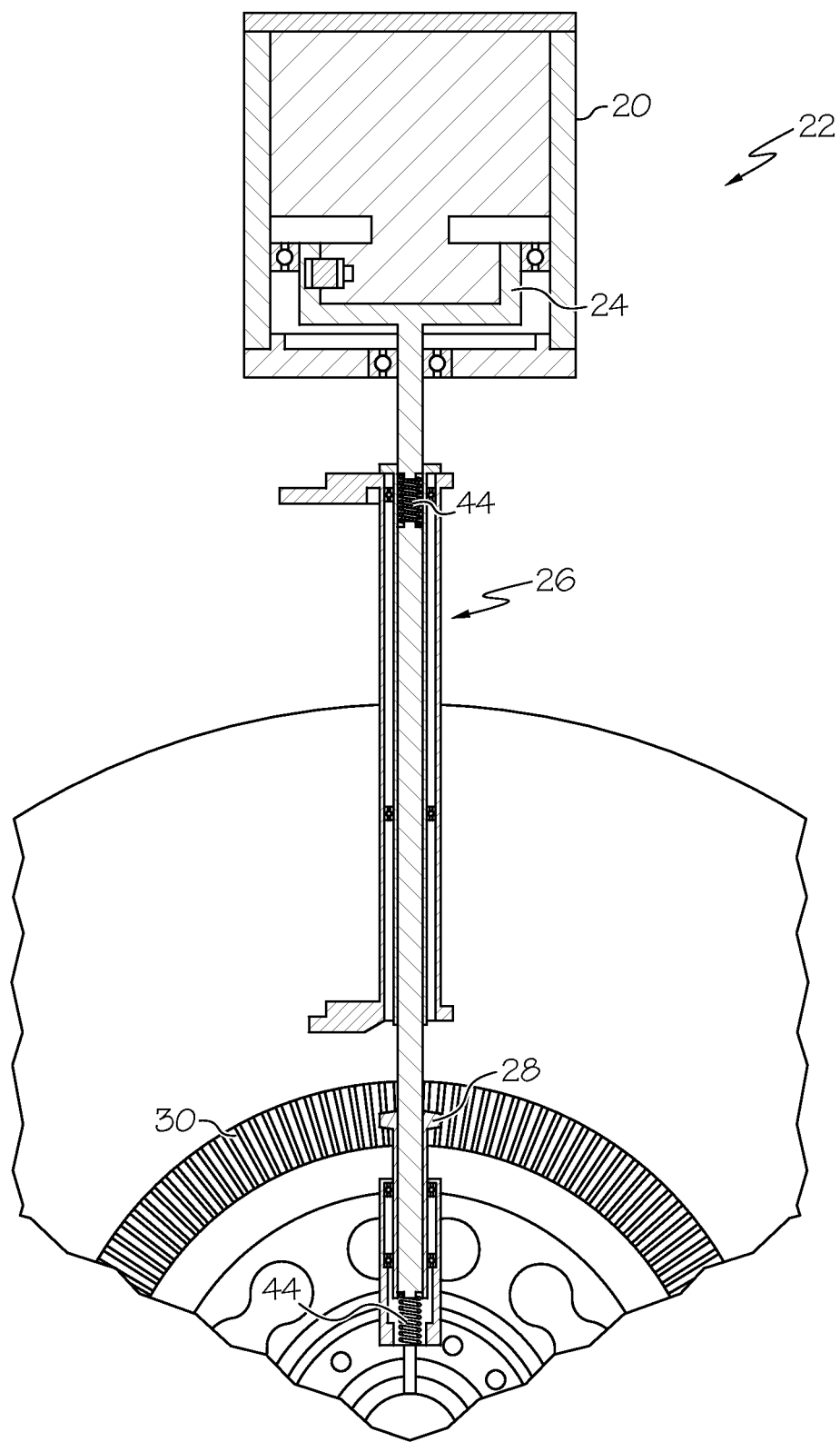
FIG. 2 is a partial sectional view of a drive train of the landing gear of FIG. 1 in accordance with an embodiment of the invention.
Figure 3:
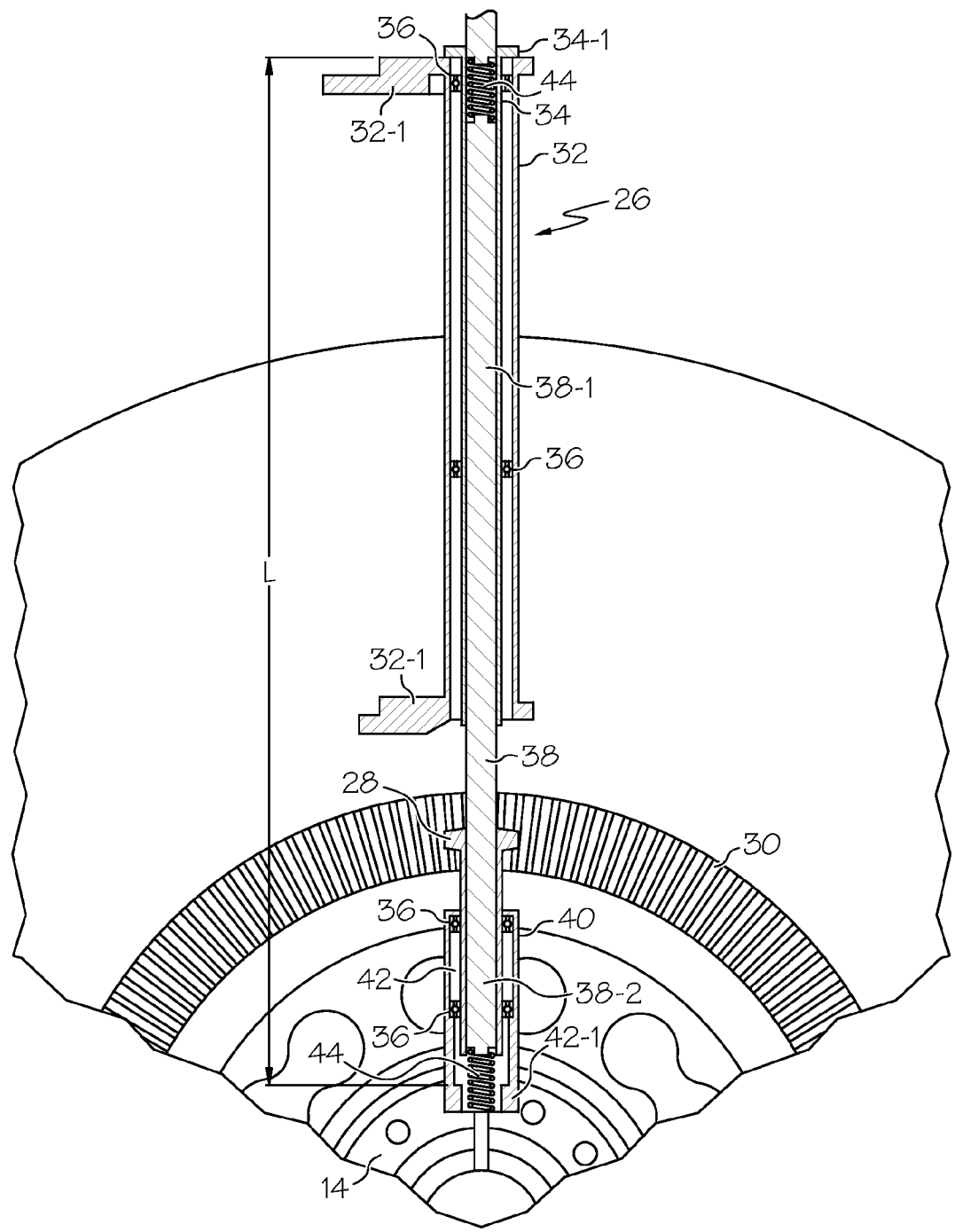
FIG. 3 is a sectional view of a telescoping shaft of the drive train of FIG. 2.

Referring now to FIGS. 2 and 3, it may be seen that an exemplary one of the drive train assemblies 22 may include a clutch 24, a telescoping shaft 26, a wheel-driving device such as a pinion gear 28 and a ring gear 30 attached concentrically with an axis of the wheel 16. An axis of the pinion gear 28 may be oriented orthogonally to an axis of the ring gear 30. Seen more closely in FIG. 3, the telescoping shaft 26 may include an internally-splined, upper outer shaft 34 within a drive shaft housing 32, bearings 36, an externally-splined, internal shaft 38, a pinion-gear housing 40, and an internally-splined lower outer shaft 42.

The drive shaft housing 32 may be attached to the bogie 12 with attachment lugs 32-1 (as shown in FIG. 1). The upper outer shaft 34 may be rotatably supported in the drive shaft housing 32 with bearings 36. The externally-splined internal shaft 38 may be positioned so that its upper portion 38-1 may be coaxial and engaged with the upper outer shaft 34. The internal shaft 38 may be free to move axially relative to the upper outer shaft 34. Because of the splined interconnection between the upper outer shaft 34 and the internal shaft 38, rotation of the upper outer shaft 34 may cause corresponding rotation of the internal shaft 38.

The pinion-gear housing 40 may be attached to the axle 14. The pinion gear 28 may be attached to the internally-splined lower outer shaft 42. The lower outer shaft 42 may be rotatably supported on bearings 36 within the pinion-gear housing 40. A lower portion 38-2 of the internal shaft 38 may be positioned coaxially within and engaged with the lower outer shaft 42. The internal shaft 38 may be free to move axially relative to the lower outer shaft 42. Rotation of the internal shaft 38 may cause corresponding rotation of the lower outer shaft 42 and the pinion-gear 28.

As an aircraft is taxied, the wheels 16 may roll across irregularities in tarmac. Consequently, there may be relative motion between the axle 14 supporting the wheels 16 and the bogie 12 as the shock absorber 18 may expand or compress. This relative motion notwithstanding, the drive assembly 26 may remain capable of imparting rotational motion from the motor 20 to the pinion gear 28.

It may be noted that the inner shaft 38 may have a length that is shorter than a minimum distance L between a bottom end 42-1 of the lower outer shaft 42 and a top end 34-1 of the upper outer shaft 34. This minimum distance L may be determined by subtracting a maximum linear range of travel of the shock absorber 18 from a nominal distance between the top end 34-1 and the bottom end 42-1 when the shock absorber 18 is fully extended. Thus, the inner shaft 34 may remain free to move axially even though the shock absorber 18 is fully compressed. In that regard, the telescoping shaft 26 has a range of linear motion that is greater than the range of linear motion of the shock absorber 18.

Compression springs 44 may be provided at each end of the inner shaft 34 so that the inner shaft 34 may be not damaged as a result of high acceleration forces. In other words, the compression springs 44 may prevent rapid axial movement of the inner shaft 34 that might otherwise result from aircraft landing impact.

It may be noted that the motor 20 may be supported on an upper portion of the bogie 12. Consequently, the motor 20 may be kept isolated from dust, dirt or debris that may be present on an airport runway or taxiway. Also, the motor 20 may be positioned so that it is not in direct contact with the wheels 16. Such an arrangement may be advantageous because brake assemblies (not shown) in the wheels 16 may become hot as a result of braking during landing. In some instances, it may be necessary to reduce the temperature of the brake assemblies before the aircraft may proceed to a subsequent take-off. In other words, an aircraft needs to have cool brakes before initiating a takeoff roll so that, in the event of a need to perform a rejected take-off, the brakes will perform effectively. If the motor 20 were in contact with the wheels 16, then heat produced by operation of the motor 20 might produce undesirable heating of brake assemblies. Conversely, heat from the brake assemblies might result in overheating of the motor 20.

Figure 4:
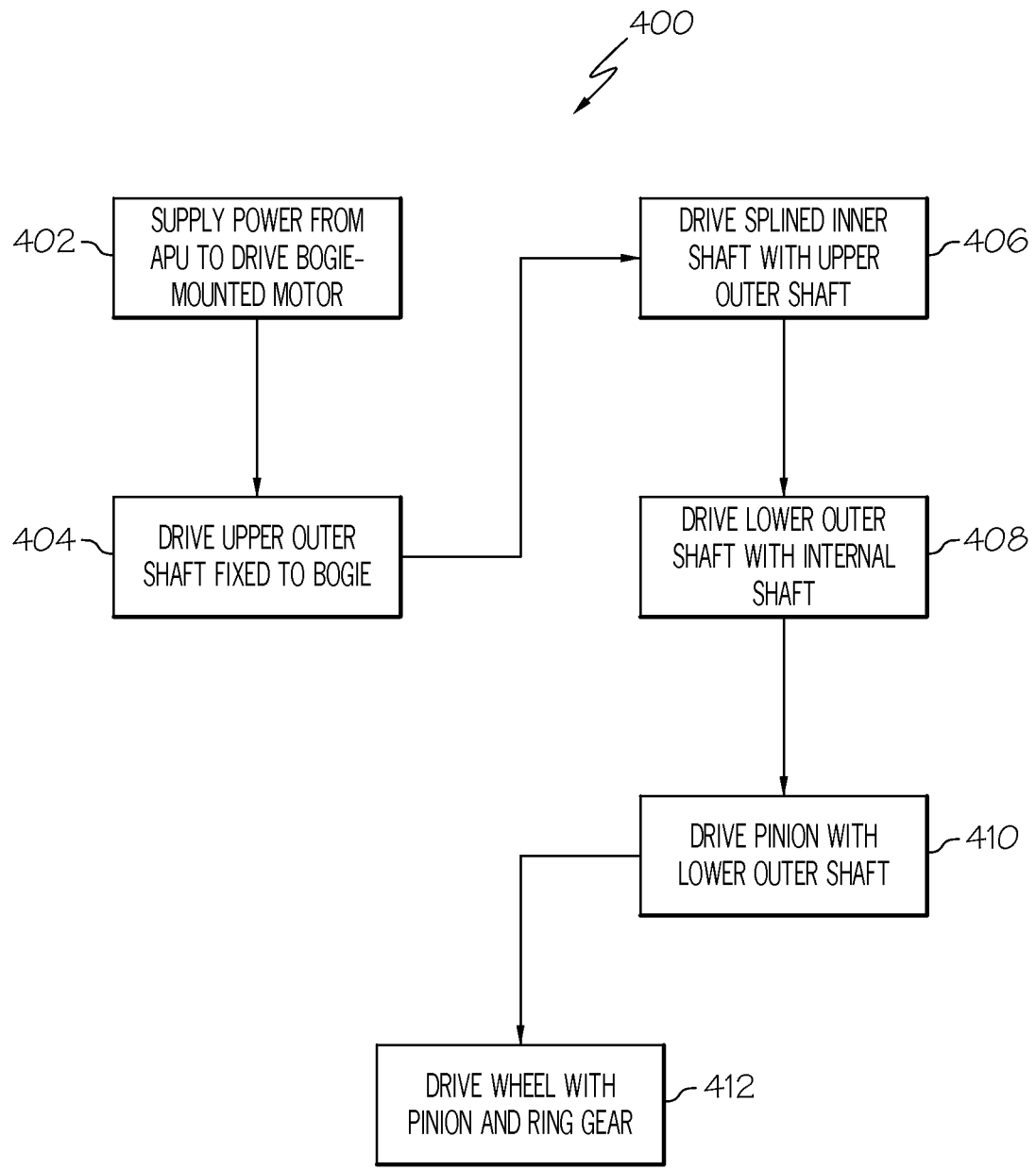
FIG. 4 is a flowchart of a method for taxiing an aircraft, including a torque transmission path, in accordance with an embodiment of the invention.

Referring now to FIG. 4, flowchart 400 illustrates a method for taxiing an aircraft. Power may be supplied 402 to a motor mounted on a bogie of a landing gear of the aircraft, for example electrical, hydraulic or pneumatic power may be supplied from an APU of the aircraft to the motor 20 mounted on the bogie 12. An upper portion of a telescoping shaft may be driven 404 by the motor, for example by the motor 20 driving the upper outer shaft 34 of the telescoping shaft 26. An inner shaft of the telescoping shaft may be driven 406, for example by the upper outer shaft 34 driving the inner shaft 38. A lower outer shaft of the telescoping shaft may be driven 408, for example by the inner shaft 38 driving the lower outer shaft 42. A wheel of the landing gear may be driven, for example by the lower outer shaft 38 driving 410 the pinion gear 28, and the pinion gear 28 driving 412 the ring gear 30 attached to the wheel 16.

It should be understood, of course, that the foregoing relates to exemplary embodiments of the invention and that modifications may be made without departing from the spirit and scope of the invention as set forth in the following claims.

We claim:

1. A motor-driven landing gear apparatus for taxiing an aircraft, comprising:
   at least one motor attached to a bogie;
   at least one wheel-driving device attached to an axle of the landing gear apparatus; and
   at least one telescoping shaft providing a torque-transmitting interconnection between the at least one motor and the at least one wheel-driving device during taxiing of the aircraft,
   wherein the at least one telescoping shaft includes:
      a first internally-splined outer shaft rotatably supported on bearings within a housing, in which the housing is attached to the bogie;
      an externally-splined internal shaft slidably engaged with the first internally-splined shaft; and
      compression springs positioned coaxially with the externally-splined internal shaft at each end of the externally-splined internal shaft.

2. The apparatus of claim 1, wherein the at least one wheel-driving device includes a pinion gear drivably engaged with a ring gear attached to a wheel of the landing gear.

3. The apparatus of claim 1, wherein two wheels are attached to the axle.

4. The apparatus of claim 3, wherein one of the motors is provided for each of the two wheels.

5. The apparatus of claim 1, wherein the at least one telescoping shaft includes:
   a second internally-splined outer shaft rotatably supported on the axle; and
   the externally-splined internal shaft interconnecting the first outer shaft and the second outer shaft.

6. The apparatus of claim 5, wherein the at least one wheel-driving device is attached to the second internally-splined outer shaft.

7. The apparatus of claim 5, wherein the lower outer shaft is rotatably supported in a pinion-gear housing attached to the axle.

8. The apparatus of claim 5, wherein the axle is attached to the bogie with a shock absorber having a predetermined range of linear motion, and the at least one telescoping shaft has a range of linear motion that is greater than the linear range of linear motion of the shock absorber.

9. The apparatus of claim 8, wherein the externally-splined internal shaft has a length shorter than a minimum distance L between a bottom end of the second internally-splined outer shaft and a top end of the first internally-splined outer shaft, the minimum distance L being the difference between the range of linear motion of the shock absorber and a distance that develops between the top end of the first internally-splined outer shaft and the bottom end of the second internally-splined outer shaft when the shock absorber is fully extended, so that the externally-splined internal shaft remains free to move axially even when the shock absorber is fully compressed.

10. A drive train for a motor driven landing gear for an aircraft, the drive train comprising:
   a gear attached to a wheel of the landing gear, the gear being coaxial with the wheel;
   a pinion engaged with the first gear;
   a drive motor attached to a bogie of the landing gear; and
   a telescoping shaft drivably interconnecting the pinion with the drive motor,
   wherein an upper portion of the telescoping shaft is supported on the bogie and a lower portion of the telescoping shaft is supported on an axle of the landing gear; and wherein the pinion is positioned between said upper portion and said lower portion of the telescoping shaft.

11. The drive train of claim 10, wherein the telescoping shaft includes:
an internally-splined upper outer shaft rotatably supported on the bogie;
an internally-splined lower outer shaft rotatably supported on the axle; and
an externally-splined internal shaft engaged with the upper outer shaft and the lower outer shaft.

12. The drive train of claim 11, wherein the axle is attached to the bogie with a shock absorber having a predetermined range of linear motion and the telescoping shaft has a range of linear motion that is greater than the linear range of linear motion of the shock absorber.

13. The drive train of claim 10; wherein the pinion has an axis of rotation orthogonal to an axis of rotation of the gear.

* * * * *